Feb. 16, 1960 F. E. LICHT 2,925,471

LINE COUPLING ARRANGEMENT FOR SIGNALING SYSTEM

Filed Oct. 30, 1956 4 Sheets-Sheet 1

Inventor:
Friedrich E. Licht

By [signature] Atty.

Inventor:
Friedrich E. Licht
By [signature] Attys.

Feb. 16, 1960 F. E. LICHT 2,925,471

LINE COUPLING ARRANGEMENT FOR SIGNALING SYSTEM

Filed Oct. 30, 1956 4 Sheets-Sheet 3

Inventor:
Friedrich E. Licht,
By [signature] Atty.

Feb. 16, 1960 F. E. LICHT 2,925,471

LINE COUPLING ARRANGEMENT FOR SIGNALING SYSTEM

Filed Oct. 30. 1956 4 Sheets-Sheet 4

Inventor:
Friedrich E. Licht.
By [signature] Atty.

2,925,471
Patented Feb. 16, 1960

2,925,471

LINE COUPLING ARRANGEMENT FOR SIGNALING SYSTEM

Friedrich Eberhard Licht, Munich-Solln, Germany, assignor to Siemens & Halske Aktiengesellschaft Berlin and Munich, a corporation of Germany Application October 30, 1956, Serial No. 619,160

Claims priority, application Germany November 19, 1955

3 Claims. (Cl. 179—18)

Figure 1:
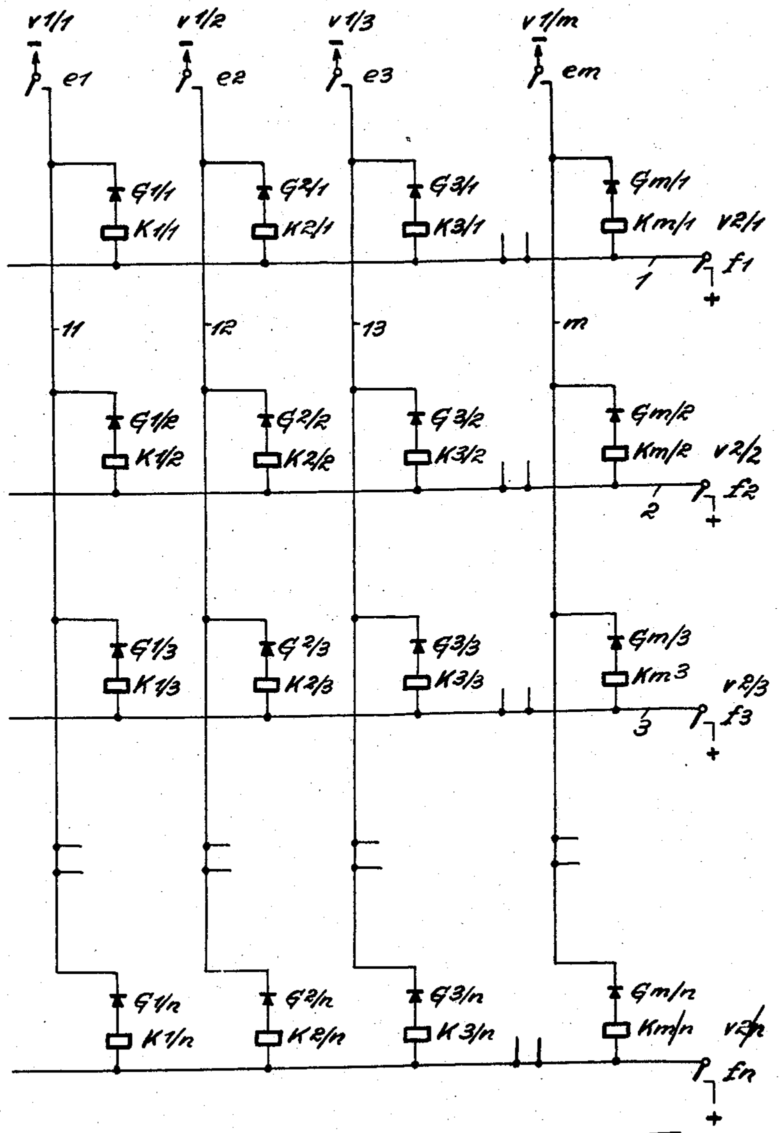

This invention relates to a line or trunk coupling arrangement for signaling systems and is particularly concerned with a circuit arrangement for interconnecting or coupling marked incoming with marked outgoing lines or trunks in a coupling or junction board of a signaling system, especially a telephone system, by means of coupling elements respectively disposed at each crossing or junction point of the corresponding lines or trunks.

are indicated at v1/1 to **v1/*m* and the outgoing lines are indicated at v2/1 to v2/*n***.

Assuming a call to be present on line v1/1 and assuming line v2/1 to be idle, contacts e1 and f1 will be closed causing energization of coupling relay K1/1 disposed at the crossing point of lines v1/1 and v2/1. However, in addition to relay K1/1, other coupling relays will also be energized over branch circuits closed thereto. Thus, merely to give an example, coupling relay K1/2 will receive current in a circuit $$(1)\qquad +, f1, 1, \begin{pmatrix} K2/1, & 12, & K2/2 \\ K3/1, & 13, & K3/2 \\ Km/1, & m, & Km/2 \end{pmatrix}, K1/2, 11, e1, -$$

Coupling relay K1/2 energizes. Of the remaining coupling relays shown, at least relays K1/3 and **K1/*n*** will also energize by way of corresponding branch circuits. Further branch circuits are omitted from consideration for the sake of simplicity.

In order to avoid the undesired energization of coupling relays, a decoupling rectifier is in known manner disposed ahead of each coupling relay. Accordingly, there are in the circuit "1" seven rectifiers as follows:

$$(2)\qquad +, f1, 1, \begin{pmatrix} K2/1, & G2/1 \text{ pass direction}, & 12, & G2/2 \text{ block direction}, & K2/2 \\ K3/1, & G3/1 \text{ pass direction}, & 13, & G3/2 \text{ block direction}, & K3/2 \\ Km/1, & Gm/1 \text{ pass direction}, & m, & Gm/2 \text{ block direction}, & Km/2 \end{pmatrix}, 2, K1/2, G1/2 \text{ pass direction}, 11, e1, -$$

When a potential is connected to all coupling elements, for example, coupling relays of an incoming line, by switching means associated with such line, for example, responsive to a call on such line, and when switching means associated with an idle outgoing line connect a counter potential to the coupling relays of all incoming lines which have access to such outgoing line, the effect will be energization not only of the coupling relay at the crossing or junction of the calling incoming line with the idle outgoing line, but, due to branch currents, coincident energization of coupling relays at other line crossing or coupling points.

The main object of the invention is to prevent in large line coupling or junction boards having decoupling rectifiers, the energization of coupling relays at line crossing points other than those marked for establishing connections, and to avoid occurrence of branch currents that might jeopardize reliability of operation.

This object is realized by subdividing the incoming and the outgoing lines into groups, forming of each group of incoming and outgoing lines a partial coupling or junction section, and completing the circuit for a coupling relay provided for interconnecting lines marked for coupling, through the medium of switching means individual to the corresponding partial junction board or section.

Figure 2:
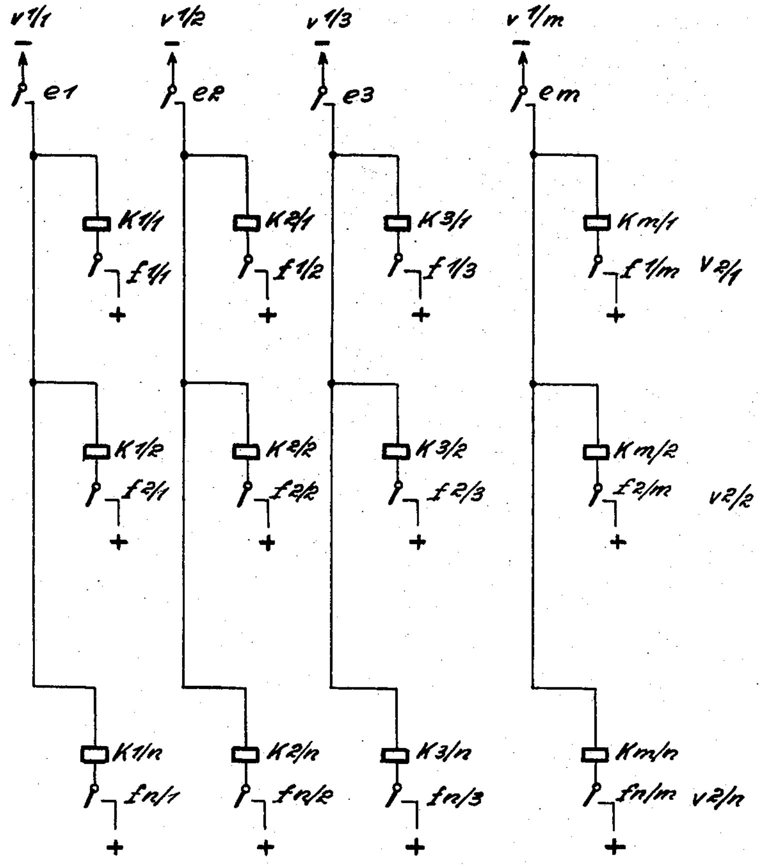
Figure 3:
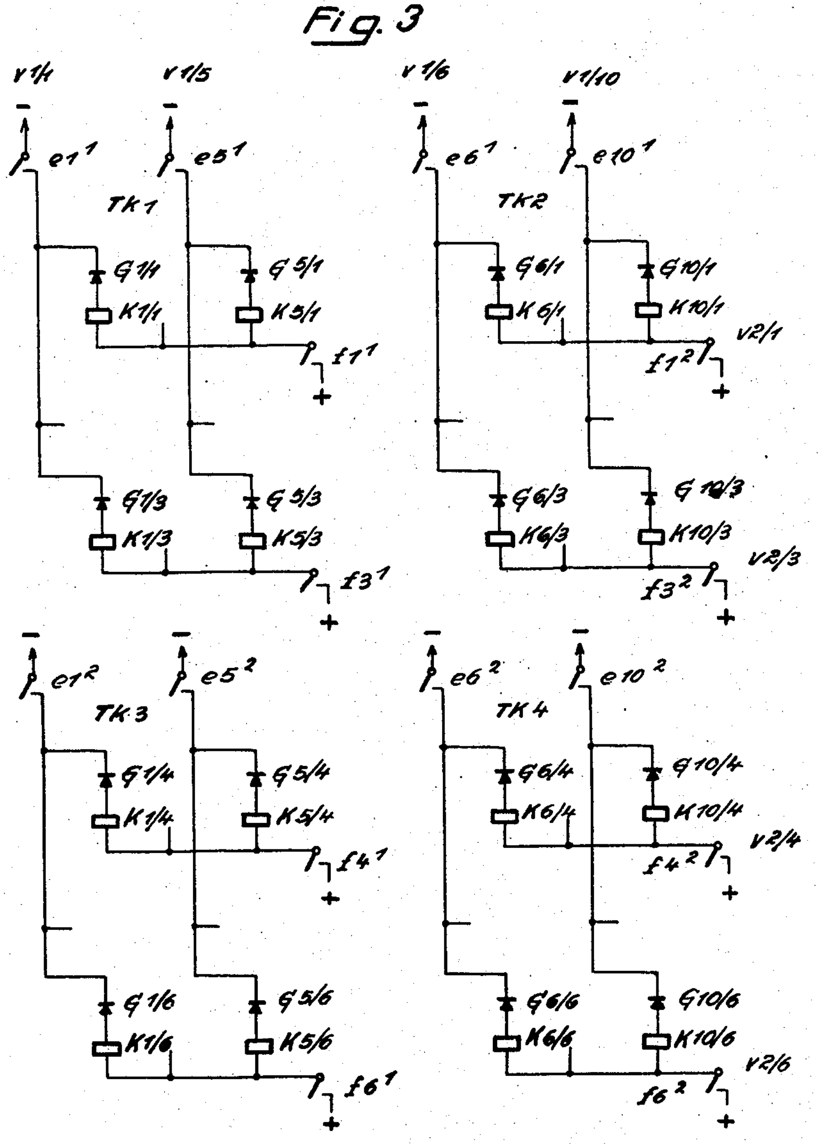
Figure 4:
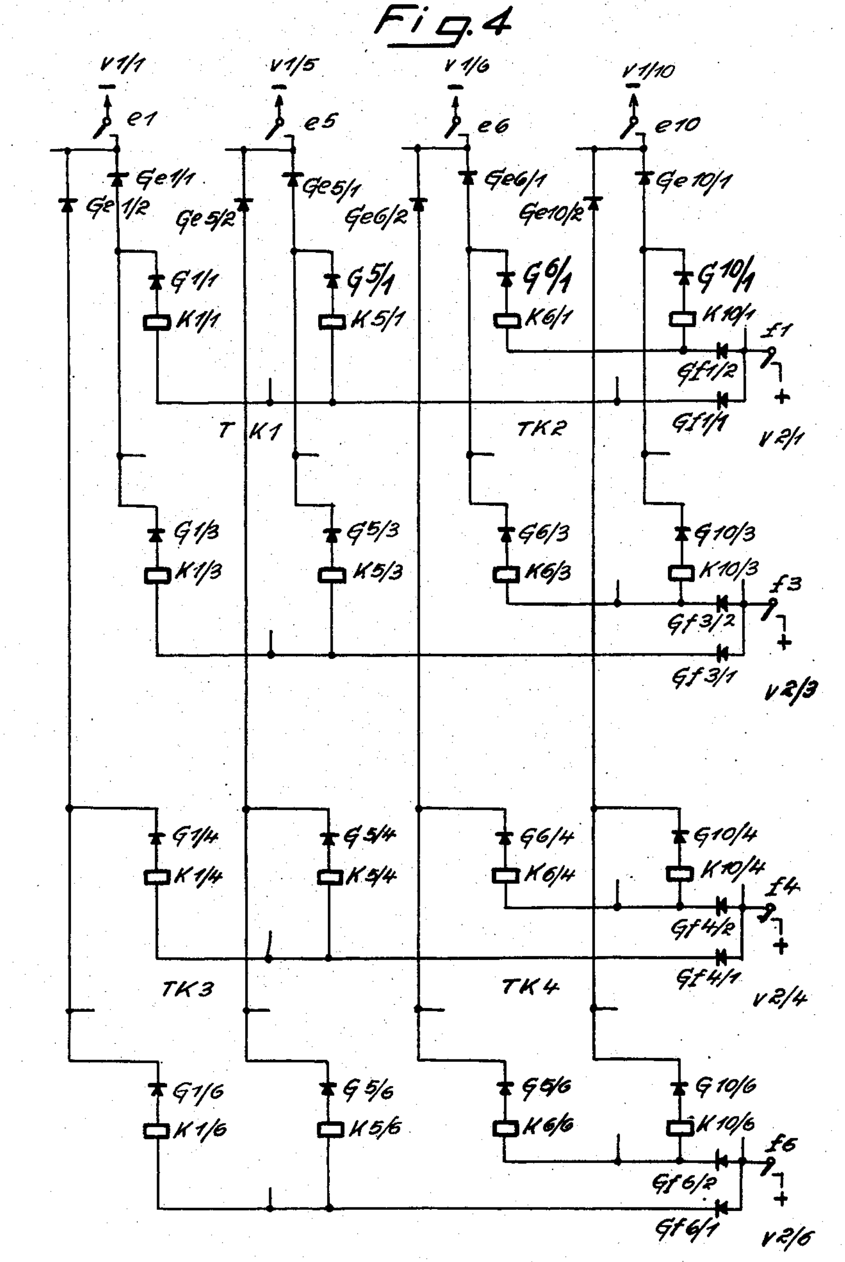

The foregoing and other objects and features of the invention will appear from the description which is rendered below with reference to the accompanying drawings. In these drawings, Fig. 1 shows a typical junction or coupling board to illustrate the occurrence of branch currents, responsible for the energization of coupling relays at crossing points of lines not marked for interconnection coincident with the energization of a coupling relay to interconnect marked lines;

Fig. 2 shows an arrangement for preventing the energization of several coupling relays responsive to connection of a potential to the marking conductor of an incoming line, by providing for each coupling relay connected to an outgoing line an individual contact over which the potential is connected; and Figs. 3 and 4 show arrangements according to the invention.

Referring now to Fig. 1, it shall first be assumed that the decoupling rectifiers are omitted. The incoming lines The rectifiers G2/2, G3/2, **G*m*/2 are in blocking direction connected to current and have as compared with the resistance of the rectifiers G2/1, G3/1, G*m*/1, G1/2**, which are traversed by current in pass direction, a very high resistance. This resistance, which shall be referred to as "blocking resistance" is of such magnitude that none of the relays included in circuit "2" can energize.

As already mentioned, there are other branch circuits to be considered. In the case of *m*-incoming lines and *n*-outgoing lines, if *m* as well as *n* is greater than 2, there will result the following branch circuits, considering only the coupling relays:

(*a*) K2/1–K2/2–K1/2
K3/1–K3/2–K1/2 (=circuit 2)
etc.
K*m*/1–K*m*/2–K1/2

(*b*) K2/1–K2/3–K1/3
K3/1–K3/3–K1–3
etc.
K*m*/1–K*m*/3–K1/3

(*c*) K2/1–K2/*n*–K1/*n*
K3/1–K3/*n*–K1/*n*
etc.
K*m*/1–K*m*/*n*–K1/*n*

All coupling relays respectively connected with marked outgoing lines and incoming lines are disposed in several circuits and affected by several blocking currents. It may accordingly happen, in large coupling or junction boards, that the blocking current affecting a coupling relay, which corresponds to the sum of the individual blocking currents, assumes a magnitude causing such relay to energize. There is therefore a limit to the size of a coupling board which cannot be exceeded.

In the case of large coupling boards there may also be observed another current that may be referred to as "leakage current." Such leakage current is represented by the sum of all currents flowing respectively over the marking conductor of an incoming line, for example, such as conductor 11, and the marking conductor of an outgoing line, such for example, as conductor 1. In large coupling boards, such leakage current may amount to a multiple of the current required for the energization of a coupling relay.

This condition results in the following situation, namely, (*a*) the marking contacts *e*1 and *f*1 are traversed by current which exceeds permissible limits; (*b*) the current consumption is very high; (*c*) if the current is conducted to the coupling boards over a preresistor, the temperature dependence of the decoupling rectifiers may have to be considered in dimensioning said resistor; and (*d*) the fuse in the battery supply line must be dimensioned in consideration of the total current.

In case of a short circuit in the wiring of the coupling board, the coil of a coupling relay may be overloaded. The fuse need not disconect responsive to such current. The relay coil however may break down.

Another known arrangement, shown in Fig. 2, provides for each coupling relay connected to an outgoing line an individual contact over which potential is connected, for the purpose of preventing energization of several coupling relays responsive to connection of a potential to the marking conductor of an incoming line. When a calling incoming line such as *v*1/1, *v*1/2, *v*1/3 or *v*1/*m*, is to be connected to outgoing line *v*2/1, assumed to be idle, positive potential (+) is respectively connected to the coupling relays K1/1–K2/1–K3/1 etc., respectively, over contacts *f*1/1–*f*1/2–*f*1/3 etc. The occurrence of branch currents is thus avoided by the provision of a great number of contacts.

In a large coupling board with, for example, three-hundred incoming lines *v*1 and two-hundred outgoing lines *v*2, not less than $300\times200=60{,}000$ *f*-contacts are required. In addition, a corresponding number of relays for operating these contacts is required. The arrangement is for these reasons uneconomical.

As has been said initially, the object of the invention is to prevent, in the case of large coupling or junction boards with decoupling rectifiers, the energization of coupling relays at the crossing points of lines which are not to be interconnected and further, to avoid the occurrence of currents that may impair reliable operation. This object is realized by subdividing the incoming and the outgoing lines into groups, forming of each group of incoming and corresponding outgoing lines a partial coupling board or section, and to complete upon marking of lines to be interconnected, the circuit for the corresponding coupling relay, by switching means individual to the corresponding partial board or section.

In accordance with the invention, the switching means may be the marking contacts. Each incoming line is thus equipped with a number of marking contacts corresponding to the number of outgoing lines in the corresponding group, and each outgoing line is equipped with a number of marking contacts corresponding to the number of incoming lines in such group.

In another embodiment of the invention, each incoming and each outgoing line is respectively provided with only a single marking contact and with a number of decoupling rectifiers corresponding to the number of partial coupling boards or sections to which there is access.

The above noted embodiments are illustrated in Figs. 3 and 4, showing only the circuits for the energizing windings of the coupling relays disposed at the crossing points of outgoing and incoming lines. Each coupling relay, upon energization, closes in known manner a holding circuit extending over a holding winding and interconnects the conductors of the corresponding incoming line with like conductors of the concerned outgoing line.

When the line *v*1/1 of Fig. 3 is to be connected to the line *v*2/1, assumed to be idle, contacts $e1^1$, $e1^2$ as well as $f1^1$ and $f1^2$ will be closed. An energizing circuit will thus be completed, in the partial coupling board or section TK1, only for one coupling relay, namely, relay K1/1, extending over the contacts $e1^1$ and $f1^1$. In the other partial boards or sections TK2—TK4 only contacts which are individual to such boards, such as $f1^2$ and $e1^2$, will be closed.

As in the coupling board explained with reference to Fig. 1, which is common to all lines *v*1 and *v*2, some branch currents will also occur in the partial or sectional board TK1 of Fig. 3. However, the blocking and the leakage currents occurring in the arrangement according to Fig. 3 will be only in amounts of fractions of those occurring in Fig. 1 and will not reach magnitudes that might impair proper operation.

In a coupling board, for example, for ten lines *v*1 and six lines *v*2, there will be 60 coupling points traversed by blocking currents. The sum of these blocking currents flowing in a coupling relay could exceed the permissible value at which the relay should still remain inoperative.

However, by subdividing the lines *v*1 and *v*2 each into two groups and therewith subdividing the coupling board into four partial boards or sections, only the blocking currents flowing over 15 coupling points can become additive. The total current then affecting a coupling relay will be insufficient to cause energization thereof. The leakage current likewise cannot reach a value that might cause trouble.

The number of line groups and therewith the number of partial coupling boards or sections will always be determined by the number of lines *v*1 and *v*2 that are present.

In the embodiment according to Fig. 4, it is assumed that there are ten incoming lines *v*1 and six outgoing lines *v*2. Each of these groups of lines is subdivided into two groups. Accordingly, there will again result four partial coupling boards or sections.

Instead of the marking contacts which are individual to the respective partial boards or sections, there are provided rectifiers, for example, rectifiers G*e*1/1, G*e*1/2 for the line *v*1/1 and G*f*1, G*f*1/2 for the line *v*2/1.

When the line *v*1/1 is to be interconnected with line *v*2/1, the coupling will be effected by completion of the circuit.

(3) +, *f*1, G*f*1/1, K1/1, G1/1, G*e*1/1, *e*1, —

Blocking current can flow over other coupling points only within the partial coupling board or section TK1. Since the number of coupling points in the partial coupling boards is considerably less than in the arrangement according to Fig. 1, such blocking current and the leakage current resulting therefrom and flowing over contacts *e*1 and *f*1 can assume only negligible values.

There are at least two rectifiers in blocking direction included in each branch circuit of the other partial coupling fields or sections TK2—TK4 and blocking current accordingly is in these branch circuits practically ineffective.

Changes may be made within the scope and spirit of the appended claims.

I claim:

1. A telephone system having a line coupling field individual to a selection stage, incoming lines terminating in said coupling field and outgoing lines extending therefrom and having coupling relays for respectively interconnecting calling incoming lines with idle outgoing lines, said incoming and outgoing lines each being divided into a plurality of groups, each group of incoming lines disposed for cooperation with a group of outgoing lines and forming therewith a partial coupling board within said line coupling field, coupling relays for respectively interconnecting incoming with outgoing lines in each partial coupling board, control means for placing marking potentials on lines to be interconnected by a coupling relay, and circuit means for energizing the corresponding coupling relay, said circuit means comprising switching means individual to the corresponding partial coupling board of which said coupling relay forms a part.

2. A system and cooperation of parts according to claim 1, comprising marking contacts constituting said control means, each incoming line having a plurality of marking contacts individual thereto, the number of said marking contacts corresponding to the number of groups of outgoing lines, and each outgoing line having a plurality of other marking contacts individual thereto, the number of said other marking contacts corresponding to the number of groups of incoming lines.

3. A system and cooperation of parts according to claim 1, comprising marking contacts constituting said control means, each incoming line having a single marking contact which is individual thereto for marking such incoming lines for the extension thereof to outgoing lines of all groups, each outgoing line having a single marking contact which is individual thereto for marking such outgoing line for the extension thereto of incoming lines of all groups, and decoupling rectifiers respectively associated with said incoming and outgoing lines, the number of said rectifiers corresponding to the number of partial coupling boards accessible to each such coupling board.

References Cited in the file of this patent

UNITED STATES PATENTS

| | | |
|---|---|---|
| 1,269,181 | Herink | June 11, 1918 |
| 1,342,792 | Bygrave et al. | June 8, 1920 |
| 1,645,972 | Rousseau | Oct. 18, 1927 |
| 2,572,266 | Jones | Oct. 23, 1951 |
| 2,609,454 | Hecht | Sept. 2, 1952 |